United States Patent [19]

Wyman et al.

[11] 4,005,018

[45] Jan. 25, 1977

[54] LIQUID FILTERING APPARATUS

[75] Inventors: Floyd H. Wyman, Mauldin; John E. Chambers, Travelers Rest, both of S.C.

[73] Assignee: Thermo-Kinetics, Inc., Greenville, S.C.

[22] Filed: May 29, 1975

[21] Appl. No.: 581,865

Related U.S. Application Data

[63] Continuation of Ser. No. 319,748, Dec. 29, 1972, abandoned.

[52] U.S. Cl. ............................. 210/386; 210/387; 210/400
[51] Int. Cl.² ......................................... B01D 33/02
[58] Field of Search ............ 210/97, 104, 121, 386, 210/387, 400, 401, 402, 404

[56] References Cited

UNITED STATES PATENTS

| | | | |
|---|---|---|---|
| 965,486 | 7/1910 | Putt | 210/400 X |
| 1,279,063 | 9/1918 | Witmer | 210/400 |
| 1,668,579 | 5/1928 | White | 210/402 X |
| 2,751,087 | 6/1956 | Wallquist | 210/387 |
| 2,752,045 | 6/1956 | Hornbostel | 210/387 |
| 2,823,806 | 2/1958 | Harlan | 210/97 X |
| 3,310,172 | 3/1967 | Beduhn | 210/387 X |
| 3,404,779 | 10/1968 | Weathers | 210/97 |
| 3,489,679 | 1/1970 | Davidson et al. | 210/386 X |
| 3,618,772 | 11/1971 | Dietrick | 210/104 |
| 3,722,682 | 3/1973 | Pistiner | 210/387 X |

*Primary Examiner*—Charles N. Hart
*Assistant Examiner*—Robert H. Spitzer
*Attorney, Agent, or Firm*—Bailey, Dority & Flint

[57] ABSTRACT

A liquid filter immersed in a contaminated liquid, defines an open space therein receiving filtered liquid in a bottom portion thereof through a filter medium disposed thereabout, with power operated means for removing spent filter medium while fresh filter medium is supplied, and an outlet communicating with the filtered liquid maintaining a liquid level outside the frame higher than a liquid level within the frame for producing the filtering action.

2 Claims, 7 Drawing Figures

LIQUID FILTERING APPARATUS

This is a continuation of application Ser. No. 319,748 filed Dec. 29, 1972, now abandoned.

BACKGROUND OF THE INVENTION

The problem of filtering a liquid containing contaminant particles in industrial applications without excessive manual operations or overly complex mechanical structure has long persisted. For example, the water used in washer sections of air handling systems of textile and paper mills contains contaminants in large volume necessitating frequent cleaning of the entire system.

It is an important object of this invention to provide a practical apparatus and method for filtering the water used in a washer section of an air handling system, and the like.

In industrial filtering applications efforts have been made to provide liquid filtering apparatus having submerged filter media that can be replaced without interruption of the filtering operation. For example, apparatus for so replacing the filter media is illustrated in U.S. Pat. Nos. 3,083,831; 3,087,620; 3,333,693 and 3,333,705. These filters use a dual chamber system wherein one chamber is superposed upon another. Such patents exhibit relatively complicated devices, affording limited filter area requiring frequent changes of filter medium, with elaborate mechanism to avoid leakage of contaminated liquid around the edges of the filter medium.

Drum filters of the vacuum type employing permanent filter medium, such as shown in U.S. Pat. Nos. 2,812,064 and 2,812,065 are sealed from the atmosphere with peripheral pockets connected with a central sleeve by spaced suction pipes. U.S. Pat. No. 1,816,132 discloses a compartmentalized drum filter wherein the level of the outflowing water inside a sieve is lower than the level of the contaminated liquid outside it. The drum filter of U.S. Pat. No. 3,651,946 employs suction through a central shaft to remove filtered liquid from the drum and to produce the filtering action.

Accordingly, an important object of this invention is to provide a simplified apparatus and method operable with a minimum of moving operations to afford a continuous liquid filtering system.

Another object of this invention is to provide a liquid filter affording a maximum of filter area affording increased flow with less changes of filter medium.

Still another important object of this invention is to provide simplified means to avoid leakage of contaminated liquid around the edges of the filter medium.

SUMMARY OF THE INVENTION

The filter of the present invention operates as a result of the difference in head between the contaminated liquid outside the hollow filter and the lower level of filtered liquid inside the filter. It has been found that a simplified filter with increased filter area may be achieved by using a continuous medium carrying frame defining an open space therein within a tank containing the contaminated liquid. By filtering the surrounding liquid from the tank, through the media which is preferably carried by driven squeeze rolls, into the bottom of the filter and removing same maintaining a liquid level outside the frame higher than a liquid level within the frame, greater filter surface area is provided and simplified structure with easier operation is afforded. The filter utilizes a single chamber open to the atmosphere within a larger receptical for receiving the liquid to be filtered. The filtered liquid is withdrawn from the lower portion within the filter.

By utilizing an arcuate frame means replacing a continuous disposable media sheet automatically is facilitated. Since the sheet may be pulled tightly about the arcuate frame, it is much easier to insure that liquid will not leak about the edges. A foldable continuous hinge strip may be provided to positively seal the edges of the filter medium.

An alternate form of the invention utilizes a drum carried within a tank having at least one sealed opening through which one open end of the drum extends to deliver filtered liquid to a tank positioned below the sealed opening. The drum is driven by power operated means having a driving connection adjacent the open end of the drum.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Referring more particularly to the drawings, a liquid filter for use in a liquid containing particles to be filtered is illustrated. A frame A defines space therein for receiving filtered liquid. Suitable means supports the frame at least partially submerged within the liquid. An outlet B communicates with the filtered liquid within the bottom portion of the filter removing filtered liquid therefrom, maintaining a liquid level outside the frame higher than a liquid level within the frame. Means C supply a continuous elongated sheet of filter medium about the frame to exclude liquid from the space with the frame except by passing therethrough. Filter medium support means D extends about and is supported by the frame. Power operated means E are provided for automatically moving the filter medium about the frame. Means F for removing spent filter medium after liquid contact include driven squeeze rolls between which the spent filter medium is passed. Thus, the filter medium may be changed as required as excessive amounts of contaminants build up thereon to maintain the flow necessary to avoid excessive variation in the liquid level within the tank.

Figure 2:
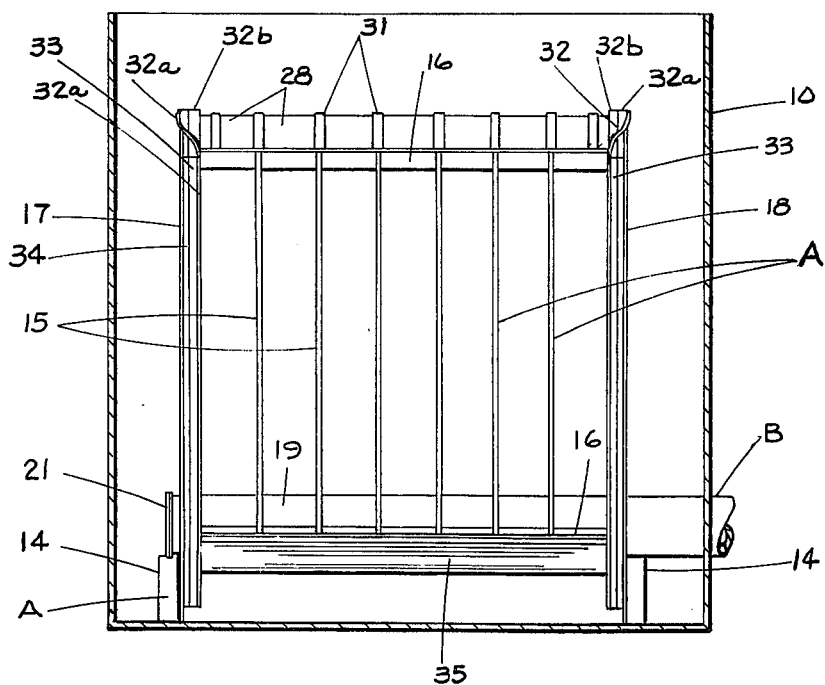
FIG. 2 is a schematic front elevation, with parts omitted for clarity, of the apparatus shown in FIG. 1.
Figure 1:
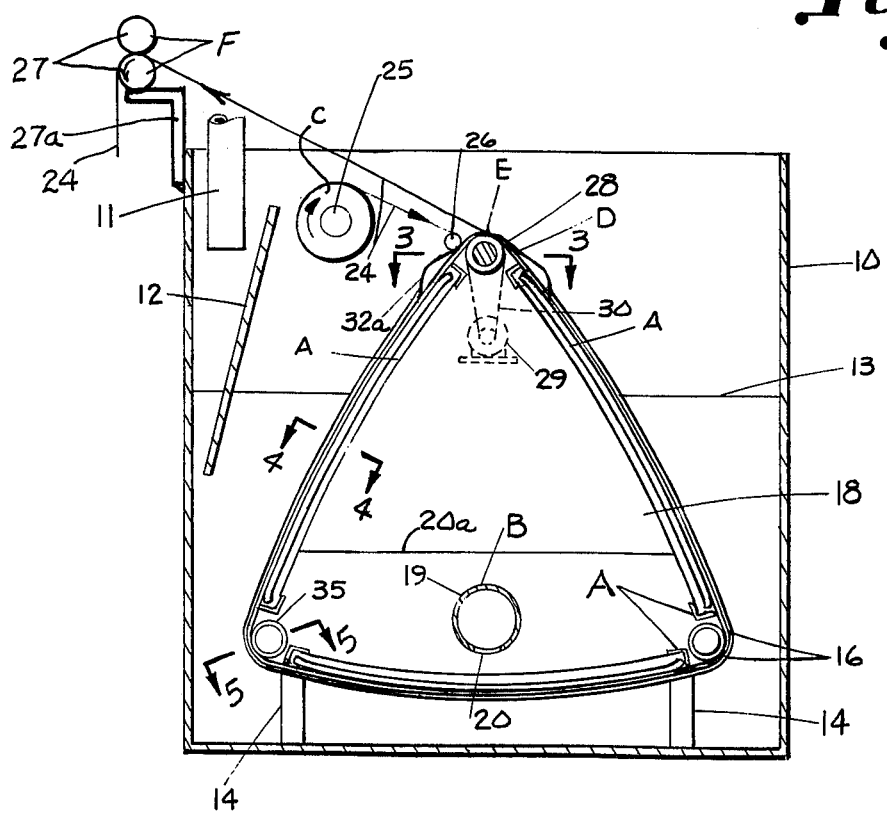
FIG. 1 is a schematic side elevation, with parts in section, illustrating a preferred embodiment of a filter apparatus constructed in accordance with the present invention.

A suitable tank 10 (FIGS. 1 and 2) receives liquid containing contaminant particles, such as lint, from the washer section of a paper mill air handling unit through the inlet 11. The inlet 11 introduces the liquid to be filtered behind a baffle 12 maintaining a liquid level 13 therein. The substantially triangular frame A defines an open space therein for receiving filtered liquid. The frame A is mounted on suitable supports 14 within the tank 10. The frame A is illustrated as being generally in the shape of an equilateral triangle defined by a plurality of spaced ribs 15 carried by a pair of transverse angle irons 16 adjacent each corner of the frame. The frame A also includes imperforate plates 17 and 18.

In the central portion of the base portion of the frame an outlet B communicates with the filtered liquid within the open space for removing the filtered liquid therefrom. The outlet B is provided in the form of a transverse pipe 19 which extends through openings in the end frame members 17 and 18. The pipe 19 has a longitudinal slot 20 therein extending between the end plate members 17 and 18 for collecting liquid to be discharged through the open right-hand end of the pipe shown in FIG. 2. The left-hand end of the pipe is capped as at 21.

Spaced arcuate tracks C (FIG. 4) extend about the frame A carried by the end frame members 17 and 18, respectively. Each of the tracks C at its free edge carries a nylon profile wear strip 22. The curved ribs 15 also serve as supports for the filter medium as will be described in greater detail below.

Figure 3:
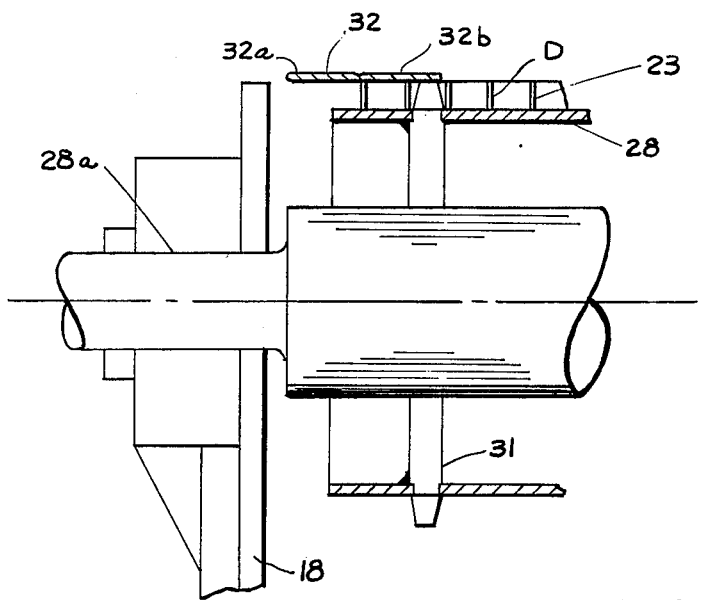
FIG. 3 is a sectional plan view taken on the line 3—3 in FIG. 1.
Figure 4:
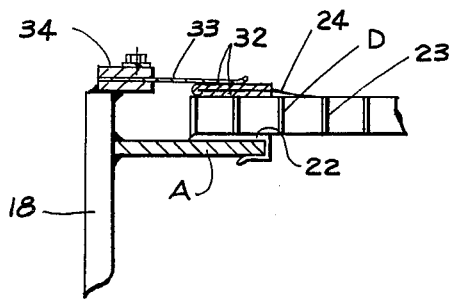
FIG. 4 is a sectional plan view taken on the line 4—4 in FIG. 1.
Figure 5:
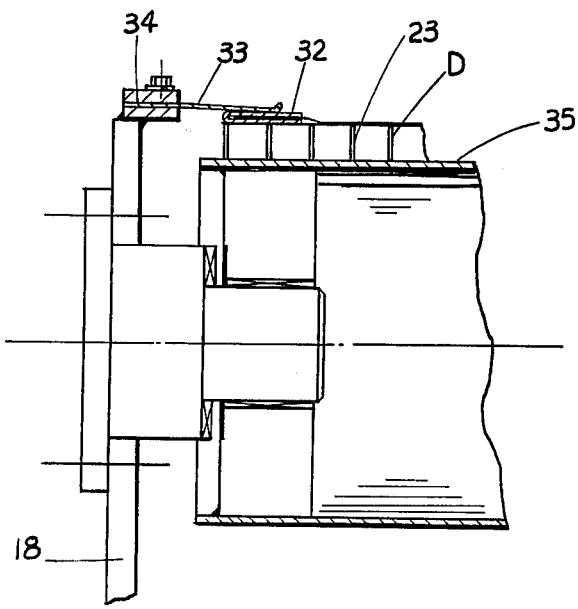
FIG. 5 is a sectional plan view taken on the line 5—5 in FIG. 1.

Continuous filter medium support means D includes a flat wire belt 23 (FIGS. 3, 4 and 5). A suitable flat wire belt may be 5½ inches × ½ inch flat head welded edge supplied by Ashworth Bros., Inc. of Greenville, S.C. The filter medium may be supplied in any number of desired weights, and may take the form of any nonwoven material provided for that purpose, such as Cerex Spunbonded Nylon by Monsanto Company. The filter medium is illustrated schematically at 24 in FIG. 1 in the form of a roll 25 from which an endless sheet passes about the roll 26, and from thence about the filter to then be taken up on the driven squeeze rolls 27 positioned upon a suitable support 27a in FIG. 1.

Power operated means E are provided for automatically moving the support means and filter medium carried thereby about the frame on the tracks including a driven roll 28. The roll 28 is suitably journalled for rotation as at 28a and is driven by motor 29 through a suitable pulley and belt arrangement schematically illustrated at 30. The roll 28 carries a number of drive sprockets 31 thereon for driving the belt D illustrated in FIG. 3. The belt D is illustrated in FIG. 3 as carrying a foldable hinged strip 32 attached to the belt 23. The hinged strip 32 is preferably of plastic and is normally biased toward the open position shown in FIG. 3. The hold-down strip 33 resiliently presses the strip 32 to closed position. It will be noted by reference to FIG. 2 that the outer edge 32a of the hinged strip is folded over upon the other half 32b as it passes beneath the hold-down strip 33. If desired, the hinge strip may be omitted and the hold-down strip 33 will press directly upon the medium sealing the edge between it and a strip substituted therefor at the edge of the conveyor belt D.

It will be further observed that rolls 35 are suitably journalled adjacent each of the lower corners of the filter and support the continuous filter support means D as it passes thereabout. It will be observed by reference to FIG. 2 that the strip 32 again opens as it passes out from beneath the hold-down strip 33.

The frame A is illustrated in the form of an equilateral triangle with arcuate convex sides. The trackway conforms thereto in order to insure that the filter medium will be pulled tightly thereagainst to avoid leakage. If desired, a frame in the shape of a right traingle (not shown) with the hypotonuse inclined upwardly on the final run of the conveyor belt. In this configuration there would be less chance of filtered solids falling off the medium carried by the conveyor belt as it rises from the liquid within the tank, and the upwardly inclined leg may be flat and not present the arcuate form as would be desirable in the other two legs.

DESCRIPTION OF AN ALTERNATE FORM

Figure 6:
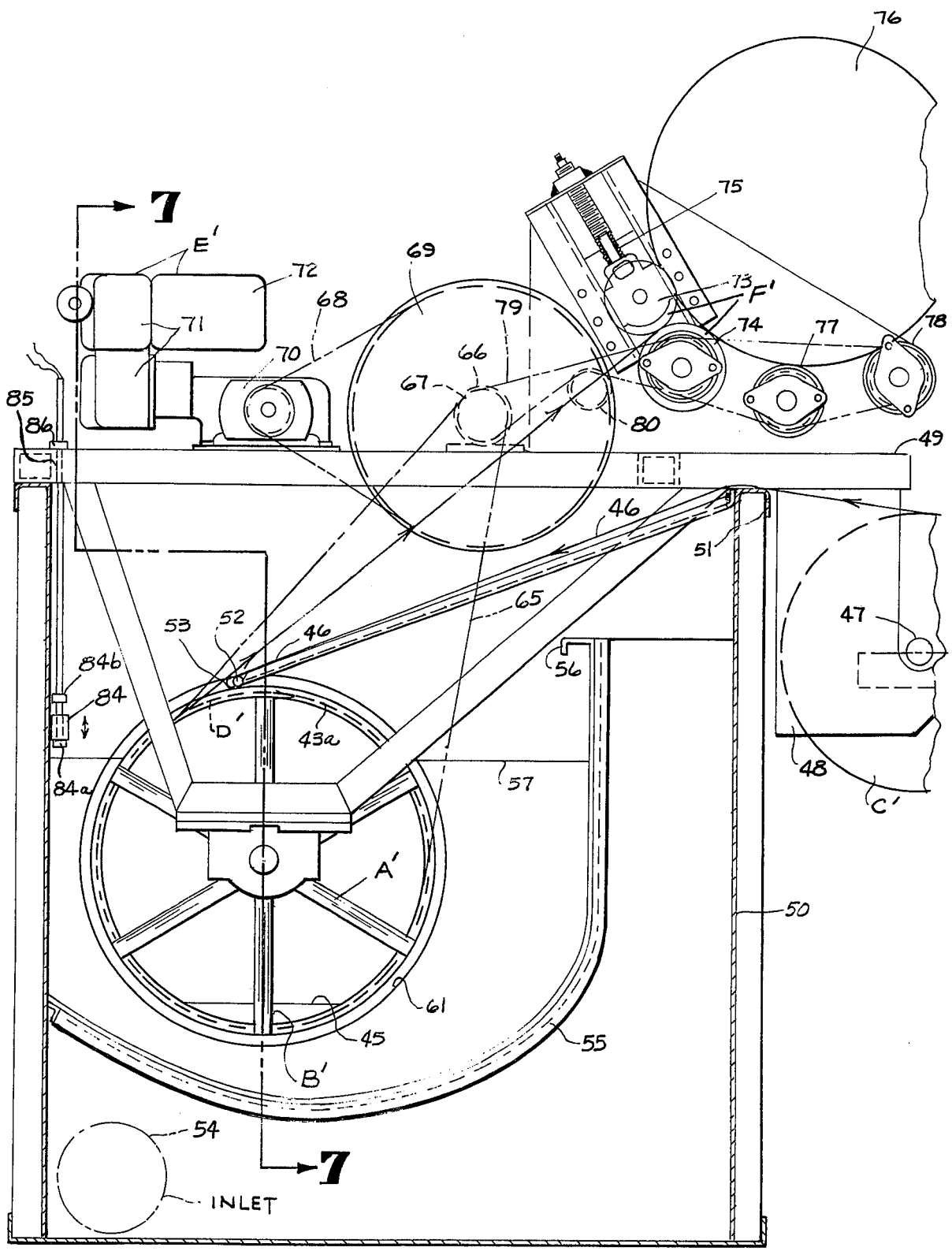
FIG. 6 is a schematic side elevation, with parts in section, illustrating a modified form of a filter further illustrating the present invention.
Figure 7:
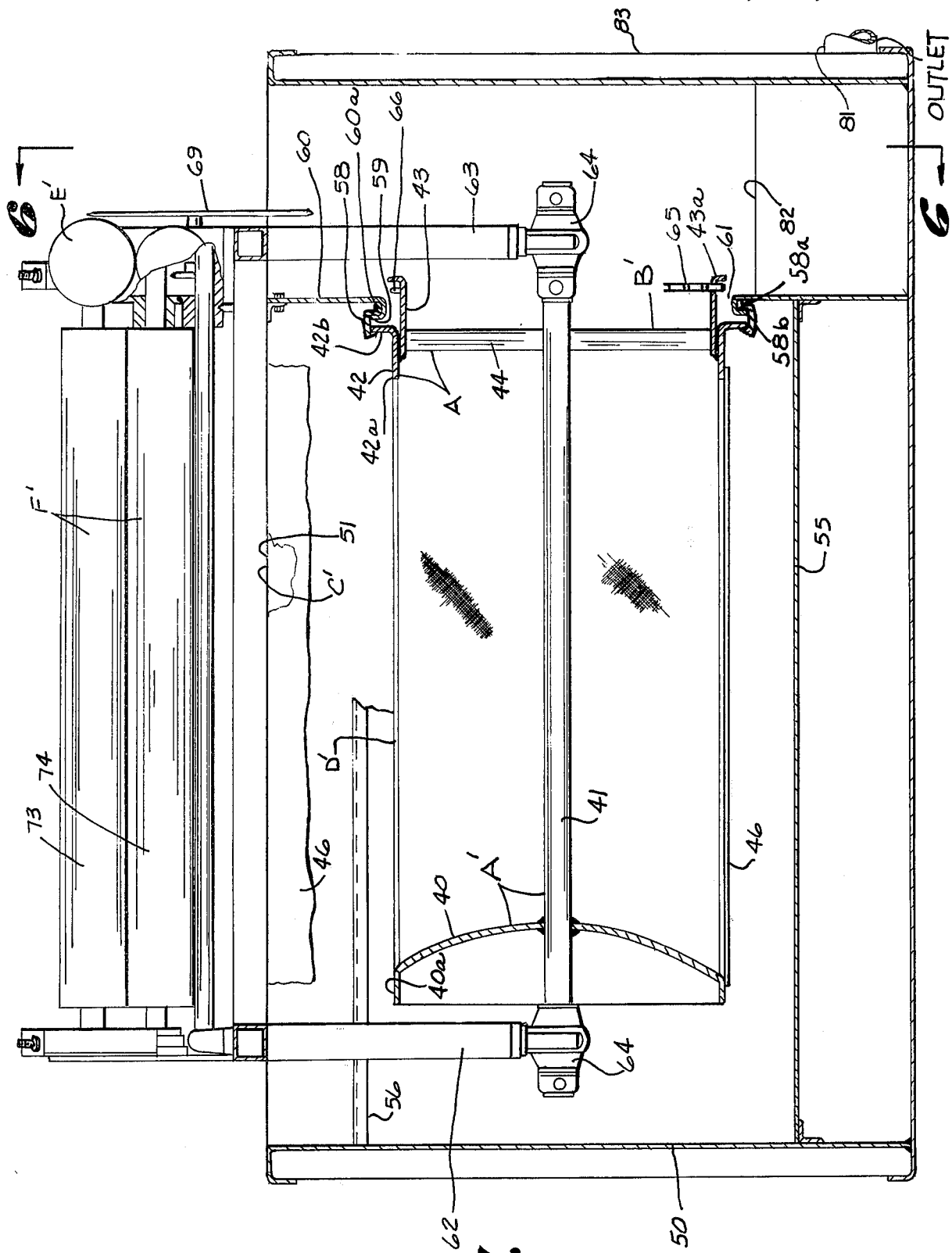
FIG. 7 is a sectional elevation taken on the line 7—7 in FIG. 6.

FIGS. 6 and 7 illustrate an alternate form of the invention wherein like reference letters designate like parts with prime notations added. The frame A generally defines a drum, which includes a convex head member 40 on one end thereof, carried by a longitudinal axially disposed shaft 41. The frame includes an annular imperforate member 42 adjacent the other end of the shaft 41 which carries therein an annular member 43. A plurality of circumferentially spaced spokes 44 support the members 42 and 43 and which are suitably secured to each other and to the spokes as by welding.

An outlet B' communicates with the filtered liquid 45 (FIG. 6). The outlet B' is defined by the open end of the drum which includes the space between the spokes 44 bounded by the annular member 43.

Means C' supply a continuous elongated sheet of filter medium 46 about the frame to exclude liquid from the space within the frame except by passing therethrough. The means C' includes a roll 47 which is journalled for rotation within a suitable support 48 which is carried by the frame members 49 supported upon a tank 50. Means C' includes a surface 51 formed by an upper surface of the tank which guides the filter medium 46 downwardly to a spreader bar 52 which has a slight bow therein, illustrated at 53, about the filter medium 46 passing about the drum in the direction of the arrow.

As will be best observed in FIG. 6, the liquid containing contaminants is fed into the tank 50 through an inlet 54. A baffle 55 permits the liquid to flow over an upper lip 56 to establish a level 57 about the drum.

Filter medium support means D' is illustrated in the form of a drum constructed of expanded metal, and such is suitably fastened as by welding to the head 40 and the annular member 42. An imperforate track portion is formed on each side of the filter medium support means D'. A flat imperforate portion 40a extends outwardly and forms a part of the concave head portion 40. An inwardly extending leg 42a of the member 42 is imperforate and serves as a track-like member for supporting the filter medium on the other side of the drum.

An upstanding leg 42b forms a rim which is carried within a deformable sealing member 58. Opposite the member 42b is an upstanding flange 59 which is carried by a tank wall or partition 60 to which the upstanding leg 59 is connected by an out-turned portion 60a which defines an opening 61. Preferably, the deformable sealing member, constructed of neoprene and the like, has fixed connection with the wall 60 as by the circular clamp 58a while a pair of inwardly extending inwardly biased lips 58b extend across and form a rotary seal embracing the members 42b and 59. Frame members 62 and 63 carry suitable bearings 64 to support rspective ends of the shaft 41 for rotation. The drum is driven by a chain 65 which drives a sprocket 66 carried by the annular drive member 43. The chain 65 is driven from a sprocket 66 carried by a counter shaft 67. The counter shaft 67 is driven by a chain 68 through a sprocket 69. The chain 68 is driven by a gear reducer 70 through a variable speed drive 71 from a motor 72.

These last mentioned drives form a means E' for automatically moving the filter medium 46 about the frame. The filter medium 46 passes around the frame upwardly in the direction of the arrow to a nip formed between the squeeze rolls F'. Adjustable pressure is applied to the nip thereof by the adjustable spring tensioning means 75, which urges the roll 73 toward the roll 74. The filter medium is collected upon the build-up roll 76 which is supported by the take-up rolls 77 and 78, which serve that purpose, together with the rolls 73 and 74. The take-up rolls are driven by the chain 79 from the counter-shaft, the chain passing over an idler roll 80.

An outlet 81 is provided for removing liquid which maintains the level 82 in a tank portion 83. The liquid level 57 is maintained within the baffle 55 by a float 84 which is carried on a pipe 85 adjustably carried by a set collar 86. The float 84 moves between the stops 84a and 84b. When the filter medium 46 becomes excessively contaminated the float 84 serves to start the motor 70 supplying new filter medium to the drum.

Thus, an expanded stainless steel drum with one end closed is suspended in a partitioned open tank. Non-woven-fabric filter media covers the drum. The open end of the drum projects through the partition between the two sections of the tank. Fluid can pass from the larger section of the tank to the smaller section only by passing through the filter media, into the drum, and out its open end.

Automatic feeding of the fresh media is a function of the rate of accumulation of solids on the filter. Flow is always constant and self-compensating. The total flow capacity is a fixed quantity based on the hydraulics of a given filter size. The filter efficiency and the solids removal capacity depend on the particular filter media used, the head differential between the outside and inside of the drum, and the speed of the media. The filter has a control unit which automatically senses and adjusts the variables. The results are constant flow and maximum efficiency, using minimum filter media.

Solid material filtered out of the fluid is carried off the drum by the web of used filter media. It passes through squeeze rolls which compact the filtered-out material, and is usually wound on a take-up roll for easy disposal or easy handling in recovery operations. Providing a continuous supply of fresh media assures effective filtering and a constant flow rate. Build-up of material within the tank is minimized; the filter is virtually self-cleaning.

While a preferred embodiment of the invention has been described using specific terms, such description is for illustrative purposes only, and it is to be understood that changes and variations may be made without departing from the spirit or scope of the following claims.

What is claimed is:

1. A liquid filter for use at least partially submerged in a tank containing liquid with contaminants therein including:
    A. a drum defining a space therein for receiving filtered liquid;
    B. means for supporting said drum for rotation in the tank at least partially submerged within the liquid therein;
    C. power operated means for supplying an elongated sheet of filter medium about the drum to exclude liquid from the space within the drum except through said filter medium;
    D. filter medium support means extending about and carried by said drum permitting liquid after passing through the filter medium to collect at a bottom portion within the drum;
    E. an outlet communicating with the filtered liquid within the drum adjacent the bottom portion of the drum for removing filtered liquid therefrom maintaining a liquid level outside the drum higher than a liquid level within the drum;
    F. a driving means having driving connection adjacent the periphery of said drum exteriorally of said tank for rotating the drum independently of the filter medium moving fresh filter medium about the drum while removing spent filter medium;
    G. sealing means including a flange carried by the tank defining an opening therein, and rotary sealing means carried by said flange within which said drum rotates, separating said driving means from said filtered liquid;
    H. means below said flange receiving filtered liquid from said drum through said opening; and
    I. squeeze rolls driven by said power operated means between which said spent filter medium is passed after liquid contact for compacting the filtered-out material and removing excess liquid from said filter media.

2. The structure of claim 1 wherein said power operated means includes a common drive shaft from which said driving means and squeeze rolls are driven.

* * * * *